June 18, 1935.  H. F. KOENEKAMP  2,004,992
COMPOSITE MOTION PICTURE
Filed Oct. 30, 1933  2 Sheets-Sheet 2
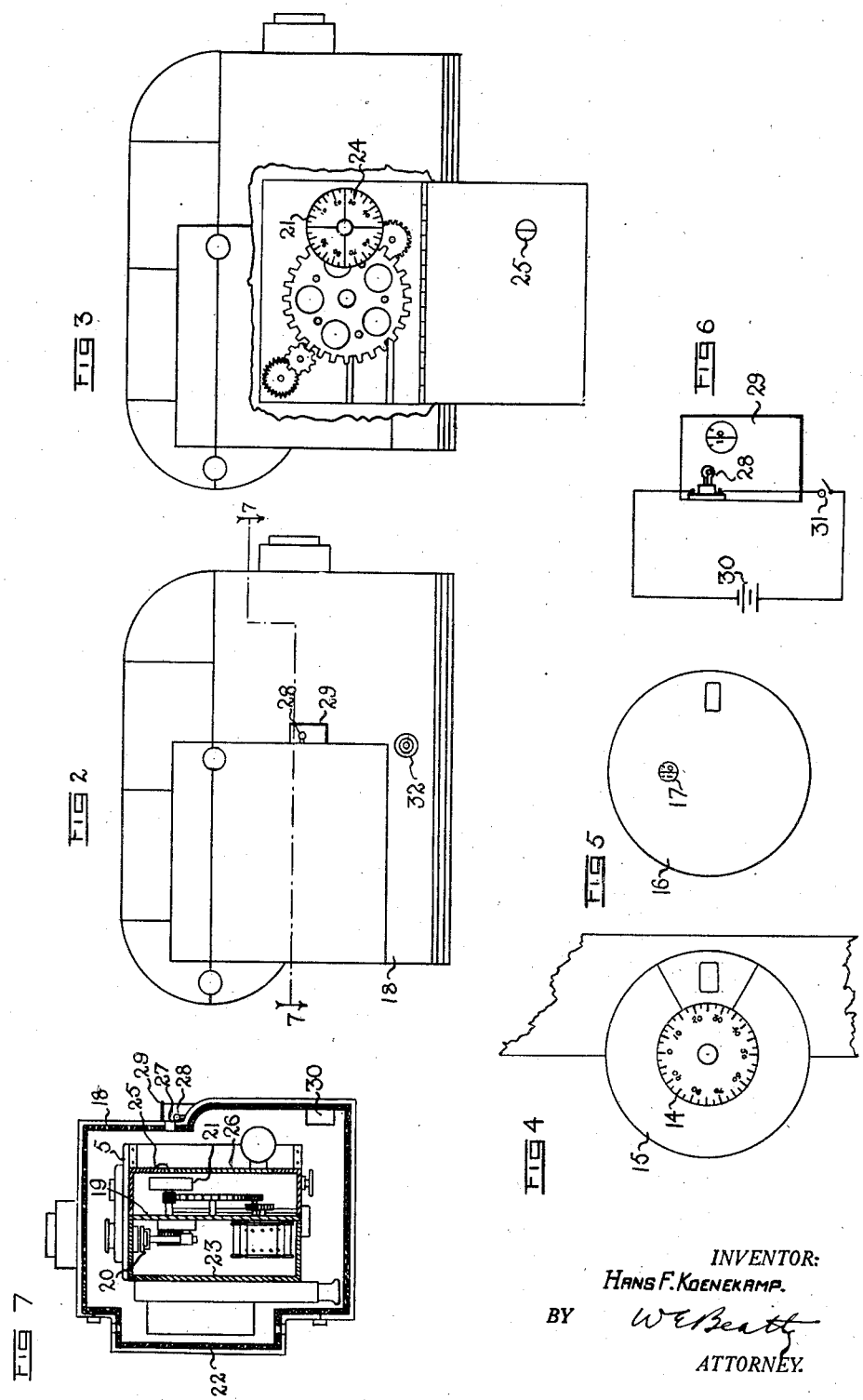
INVENTOR:
HANS F. KOENEKAMP.
BY W E Beatty
ATTORNEY.

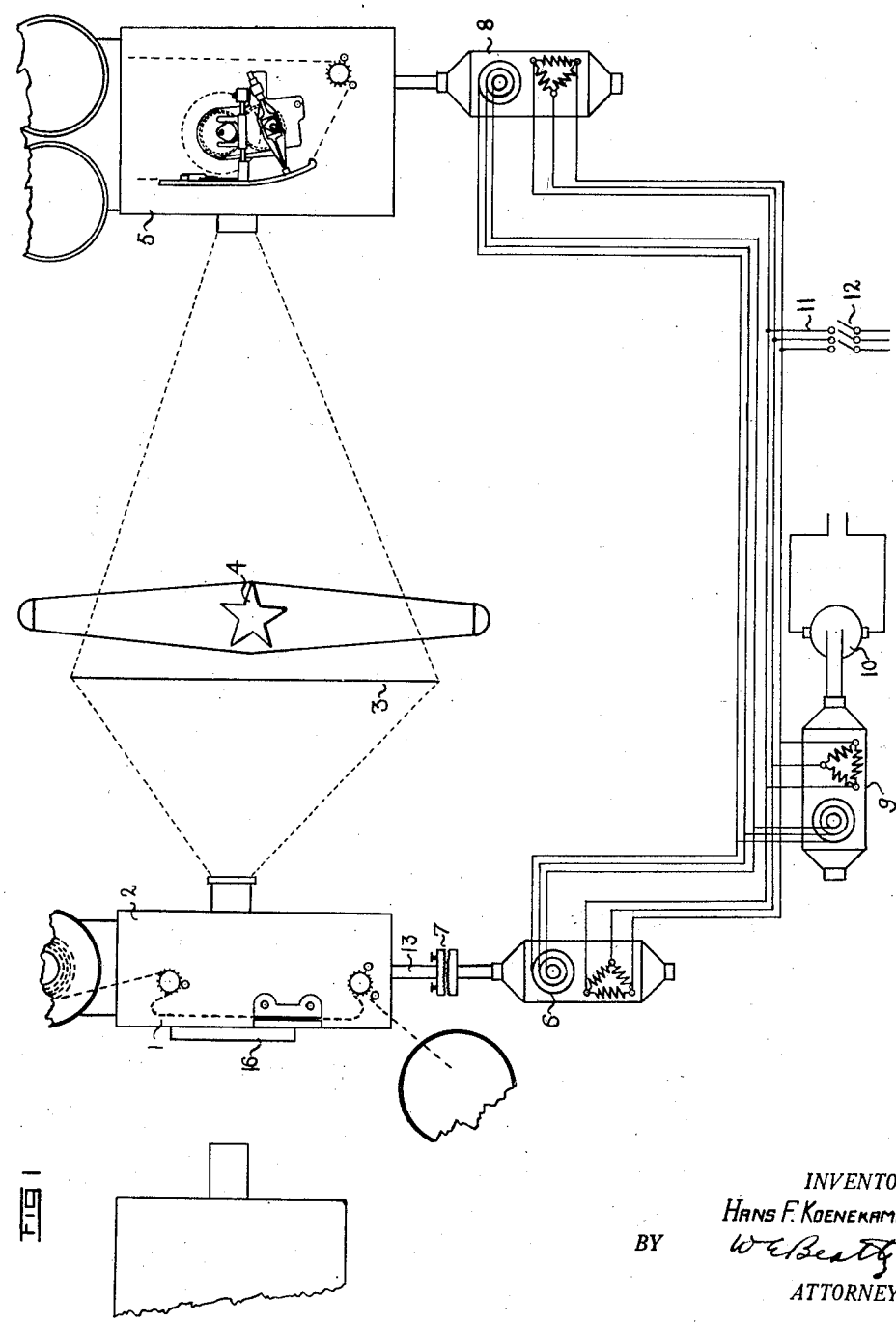

Patented June 18, 1935

2,004,992

UNITED STATES PATENT OFFICE 2,004,992

COMPOSITE MOTION PICTURE

Hans F. Koenekamp, Los Angeles, Calif., assignor to Warner Bros. Pictures, Inc., New York, N. Y., a corporation of Delaware Application October 30, 1933, Serial No. 695,789

5 Claims. (Cl. 88—16)

The invention relates to composite motion pictures wherein a camera and a projector are positioned at opposite sides of a translucent screen, the projector being employed to project a background scene on the translucent screen, while the camera photographs a foreground scene in front of the screen. The camera thus photographically produces a composite picture wherein the foreground action appears to have taken place at the locus of the scene projected on the screen.

In my application, S. N. 609,189 filed May 4, 1932 for Composite motion pictures and in my application, S. N. 629,123, filed August 17, 1932 for Composite motion pictures, I have pointed out the necessity for moving the film in the projector in synchronous and isochronous relation with the film in the camera and have disclosed and claimed an arrangement for bringing the film advancing mechanisms of the camera and the projector to the same start position, and for thereafter moving them in the same phase in synchronism. The specific embodiment disclosed in the above mentioned applications comprises calibrations adjacent the pull-down pins for the camera, with corresponding calibrations for the pull-down pins of the projectors, an adjustable coupling being provided between the projector and its motor, whereby the pull-down pins for the projector may be moved into any given start position assumed by the pull-down pins for the camera. In order to read the calibrations for the camera, it is necessary to open a side door of the sound proof casing for the camera and then to open a side door for the camera, to expose the calibrations to view. This operation not only consumes some time, but exposes to light whatever film there may be in the camera. Also the arrangement heretofore proposed makes it impossible to view the indicia for the camera unless the camera is open.

An object of the present invention is to overcome the defects just mentioned and to make it possible to view the camera indicia while the camera is closed, and more particularly while both the camera and its sound proof casing are closed.

This is accomplished by providing indicating means visible from the exterior of the camera while the camera door is closed, for indicating the calibrated stationary positions of the pull-down mechanism of the camera. In the case where the camera is provided with a sound proof casing, this indicating means is likewise visible from the exterior thereof while it is closed. Corresponding calibrations are provided for the projector which has an adjustable coupling to its driving motor, whereby the pull-down mechanism for the projector may be moved into any position assumed by the pull-down mechanism for the camera. Both pull-down mechanisms are operated thereafter in synchronism.

For further details of the invention reference may be made to the drawings, wherein:

Fig. 1 is a schematic view of a synchronous camera and projector arrangement according to the invention.

Fig. 2 is a side elevation of the camera in Fig. 1.

Fig. 3 is a side elevation of the camera of Fig. 2 with the side wall of the sound proof casing broken away, and the side door of the camera open to disclose the indicia on the camera mechanism.

Fig. 4 is a front elevation of the shutter of the projector of Fig. 1, showing the indicia thereon.

Fig. 5 is a front elevation of the cover of the shutter of Fig. 4.

Fig. 6 is a schematic view of the sight aperture in the side of the casing of Fig. 2, with illuminating means therefor.

Fig. 7 is a sectional view on line 7, 7 of Fig. 2.

Referring in detail to the drawings, a positive print 1 of the background component of the composite picture is projected by projector 2 onto the back of a translucent screen 3 in front of which the foreground scene or action 4 is photographed by the camera 5. The projector 2 is here illustrated as a standard Bell and Howell projector, while the camera 5 is illustrated as a standard Mitchell camera.

The projector 2 and camera 5 are driven in synchronism by suitable means, such as the synchronous motor 6 which is adjustably coupled to the projector by the coupling 7 and synchronous motor 8 which is directly coupled to the camera 5. The slip rings of motors 6 and 8 are connected together and to the slip rings of a distributor 9 which is driven by a constant speed direct current motor 10. The 3-phase fields of motors 6 and 8 and distributor 9 are supplied from a suitable line 11 which supplies 3-phase current. Due to the interlocking connection between the slip rings, the motors 6 and 8 run in synchronism and at a speed set by the distributor 9, as is well understood.

At the start of making a composite picture, the switch 12 in the line 11 is closed with motor 10 de-energized, whereupon the fields of motors 6 and 8 being energized, the armatures thereof move in one direction or another a fraction of a revolution and lock in a definite starting position. By means of indicia, which will be later described, the position of the pull-down mechanism of camera 5 is read and 'phoned over a telephone line (not shown) to the projectionist who unfastens the coupling 7 and rotates the drive shaft 13 to move the pull-down mechanism of projector 2 into the same start position as that assumed by the camera 5. For this purpose the projectionist employs indicia on the projector 2 which correspond to the indicia on the camera 5. As illustrated in Fig. 4, the indicia 14 for the projector are provided on the shutter 15 thereof, the circumference of the indicia conveniently being divided into 100 parts, one revolution of the shutter of course corresponding to one complete cycle of movement of the pull-down mechanism. The door 16 (see Fig. 5) which covers the shutter 15 of Fig. 4 is provided with a sight aperture 17 vertically above the axis of rotation of the shutter and the indicia carried thereby.

As illustrated in Fig. 7, the camera 5 is provided with a sound proof casing 18. The camera 5 comprises a partition 19 on one side of which the film gate 20 and associated pull-down mechanism are arranged, and on the other side of which the power drive mechanism and its associated flywheel 21 are arranged.

I have heretofore proposed to place the indicia for the camera at the side of the film gate 20, which made it necessary to open the side door 22 of the sound proof casing as well as the adjacent side door 23 of the camera in order to read the indicia. According to the present invention, I provide means whereby the indicia for the camera mechanism may be read while the camera and its sound proof casing are closed. To this end I provide the camera indicia, illustrated at 24 in Fig. 3 on the camera flywheel 21, an aperture 25 being provided in the side wall 26 of the camera, and an aligned aperture 27 being provided in the side wall of the sound proof casing 18. Aperture 25, like aperture 27, is located vertically above the center of rotation of its associated indicia 24. The camera indicia 24, like the projector indicia 14, makes one complete revolution for one cycle of movement of the pull-down mechanism and the circumference of both indicia are divided into the same number of parts, such as 100. The partition 19 seals the camera film from light and it is therefore possible to employ the apertures 25 and 27 without exposing the film in the camera. In order that the indicia 24 may be read, I provide suitable means for illuminating the same, such as a very small incandescent lamp 28 (see Figs. 6 and 7) mounted on the outside of the sound proof casing 18 adjacent aperture 27. The lamp 28 may be protected by an enclosure 29 in the form of walls of cellulose material arising from and cemented to the side wall of the casing 18. The lamp 28 is supplied with current from a small dry battery 30 which may be stored inside the casing 18 as illustrated in Fig. 7. The circuit from battery 30 to lamp 28 is controlled by switch 31 as shown in Fig. 6 and this switch may be in the form of a push-button 32 mounted on the side wall of casing 18 as illustrated in Fig. 2.

After the projector shaft 13 has been moved so that the reading opposite aperture 17 is the same as the reading opposite aperture 25, the clutch 7 is locked, the motor 10 is brought up to speed and the projector 2 and camera 5 thereafter operate not only in synchronism but their respective pull-down mechanisms operate in the same phase, that is, in isochronism.

Having thus described the invention, what is claimed as new and desired to secure by Letters Patent is:

1. A motion picture camera having a partition, a pull-down mechanism on one side of said partition, means comprising a flywheel on the other side of said partition for operating said pull-down mechanism, calibrations on said flywheel for indicating the various stationary positions of said pull-down mechanism, a sound proof casing for said camera, and means comprising an aperture in said sound proof casing whereby said calibrations are visible from the exterior of said sound proof casing.

2. Photographic apparatus comprising the combination of a camera having film advancing mechanism, a synchronous motor therefor, a projector having film advancing mechanism, a synchronous motor therefor, indicia individual to said film advancing mechanisms for indicating the positions thereof, a circuit for operating said motors in synchronism, means for changing the driving relation between the film advancing mechanism for said projector and its associated motor to adjust the film advancing mechanism of said projector in relation to its associated indicia to correspond with the start position indicated by the film advancing mechanism of said camera and its associated indicia, a casing for said camera, and means comprising an aperture in said casing for permitting an observer to read the indicia for said film advancing mechanism for said camera when said casing is closed.

3. Photographic apparatus comprising the combination of a camera having film advancing mechanism and a member rotatable therewith, a synchronous motor therefor, a projector having film advancing mechanism and a member rotatable therewith, a synchronous motor therefor, indicia individual to said rotatable members for indicating the positions of said film advancing mechanisms, a circuit for operating said motors in synchronism, means for changing the driving relation between the film advancing mechanism for said projector and its associated motor to adjust the film advancing mechanism of said projector in relation to its associated indicia to correspond with the start position indicated by the film advancing mechanism of said camera and its associated indicia, a casing for said camera, and means comprising an aperture in said casing for permitting, an observer to read the indicia for said film advancing mechanism for said camera when said casing is closed.

4. Photographic apparatus comprising the combination of a camera having a movable part associated with the film advancing mechanism therefor, a calibrated scale for indicating any position said part may assume, a projector having a movable part associated with the film advancing mechanism for said projector, a calibrated scale for indicating any position said last mentioned part may assume, means for operating said camera and said projector in synchronism, and means for moving one of said movable parts independently of the other thereof and to bring both movable parts to corresponding positions on said scales, a sound proof casing for said camera, and means for observing said calibrated scale for said movable camera part when said casing is closed.

5. A motion picture camera having a partition, a pull-down mechanism on one side of said partition, means comprising a flywheel on the other side of said partition for operating said pull-down mechanism, calibrations on said flywheel for indicating the various stationary positions of said pull-down mchanism, a sound proof casing for said camera, and means whereby said calibrations are visible from the exterior of said sound proof casing.

HANS F. KOENEKAMP.